INVENTOR
CHESTER WILKINS
BY
ATTORNEY

INVENTOR
CHESTER WILKINS

BY
*Bernard J. Brown*
ATTORNEY

INVENTOR
CHESTER WILKINS
BY
ATTORNEY 3,586,584
AUTOMATIC PLASTIC WELDING MACHINE
Chester Wilkins, 741 W. La Denny Drive,
Ontario, Calif. 91764
Filed Oct. 28, 1968, Ser. No. 770,969
Int. Cl. B29c 27/02
U.S. Cl. 156—499                                   7 Claims

ABSTRACT OF THE DISCLOSURE

An automatic machine is provided for formally butt welding to thermoplastic work members, such as plastic sheets. The machine has a frame mounting relatively movable horizontal work tables to which are clamped the work members to be joined, a heater blade which moves vertically between the tables, and an automatic control system which is operable to cause the machine to proceed through an automatic work cycle involving initial retraction of the work tables to separate the work members, heating of the blade to a predetermined temperature, movement of the heated blade to an extended position between the work members, inward extension of the work tables toward one another to engage the confronting edge surfaces of the work members with opposite sides of the blade, whereby these edge surfaces are heated to a tacky state, momentary retraction of the work tables to separate the work members, retraction of the heater blade from between the work members, and final inward extension of the work tables to press the tacky surfaces of the work members firmly together for a period of time sufficient to enable firm bonding of the members to one another.

BACKGROUND OF THE INVENTION

Field of the invention

This invention relates generally to plastic working machines. More particularly, the invention relates to a novel automatic machine for formally butt welding to thermoplastic work members, such as plastic sheets, to one another edge to edge.

Prior art

Various techniques have been devised for joining edge to edge plastic work members, such as plastic sheets. Two of the more common techniques are adhesive bonding and thermal welding. The present invention is concerned with this latter technique and will be disclosed in connection with thermally butt welding two plastic sheets to one another.

There is currently available on the market a thermoplastic butt welding machine for joining two plastic sheets in this fashion. Briefly, this machine comprises a frame mounting two relatively movable horizontal work tables. These are provided for clamping the plastic work members or sheets to be joined to these work tables along the confronting edges of the tables. Movable vertically between the tables is a heater blade. During a typical work cycle of such a machine, the blade is initially heated to a predetermined temperature and extended to a work heating position, wherein the blade is situated between the confronting edge surfaces of the work members which are clamped to the work tables. The work tables are then driven in relative edgewise movement to effect relative extension of the tables toward one another to bring the edge surfaces of the work members into contact with opposite sides of the hot blade. These edge surfaces are thereby heated to a tacky state by the blade. At this point, the tables are momentarily retracted away from one another to permit retraction of the heater blade from between the work members, after which the tables are again extended inwardly toward one another to bring the tacky edge surfaces of the work members into firm bonding contact. The work members are retained in this bonding relation for a period of time sufficient to enable cooling of the surfaces and, thereby, secure thermal bonding of the work members to one another.

SUMMARY OF THE INVENTION

The present invention provides an improved thermoplastic butt welding machine of the character described which is automatic in operation. Generally speaking, this machine comprises the same basic structure as the existing plastic welding machines just described. Thus, the present machine comprises a frame, relatively movable work tables on the frame, means for clamping the work members to be joined to the work tables along the confronting edges of the tables, a heater blade movable vertically between the tables, means for heating the blade, means for driving the work tables in relative edgewise movement toward and away from one another, and means for driving the heater blade vertically between extended and retracted positions relative to the tables. As will appear presently, however, the present machine does embody certain novel mechanical features which particularly adapt the machine for its automatic operation. The primary contribution of the present invention resides in an automatic control system for causing the machine to proceed through an automatic work cycle. This work cycle involves initial relative retraction of the work tables to separate the plastic work members which are clamped to the work tables, heating of the heater blade to a predetermined temperature and extension of the blade to a work heating position between the confronting edge surfaces of the work members, relative inward extension of the work tables to bring the edge surfaces of the work members into contact with opposite sides of the heated blade for a period of time sufficient to heat these surfaces to a tacky state, momentary retraction of the tables to separate the work members, retraction of the heater blade from between the work members, and final reextension of the work tables toward one another to bring the tacky edge surfaces of the work members into firm bonding engagement. The work members are retained in this bonding relation sufficiently long to enable the contacting surfaces to cool or set.

DESCRIPTION OF THE PREFERRED EMBODIMENT

Referring now to these drawings, there is illustrated an automatic plastic welding machine 10 according to the invention. This machine has a frame 12 mounting a pair of work tables 14 and 16. Tables 14 and 16 are located in a common horizontal plane and have confronting parallel edges 18 and upper work supporting surfaces 20. The tables are supported on the frame for relative edgewise movement toward and away from one another. In the particular welding machine illustrated, the left-hand work table 14 is rigidly fixed to the frame. The right-hand work table 16 is supported on the frame for edgewise movement toward and away from the fixed table 14.

Work tables 14 and 16 are adapted to support a pair of thermoplastic work members 22 and 24 to be thermally butt welded to one another. In this case, the work members comprise thermoplastic sheets which are placed on the upper work supporting surfaces 20 of the work tables with edge surfaces 26 of the sheets confronting one another and disposed in parallel relation to the confronting edges 18 of the tables. As shown best in FIGS. 4 and 9 through 15, these inner confronting edges of the work sheets project inwardly a small distance beyond the inner confronting edges of the tables. Clamping means 28 are provided for releasably clamping the work members or work sheets 22, 24 to the work tables 14, 16 along the inner edges 18 of the tables.

Mounted on the machine frame 12, in a vertical plane passing between and parallel to the inner confronting edges 18 of the work tables 14, 16 is a heater blade 30. This blade is movable vertically in its plane to and from a position between the confronting inner edge surfaces 26 of the work sheets 22, 24. Associated with the blade 30 are means 32 for heating the blade.

The plastic welding machine 10, as it is thus far described, is generally conventional. A primary feature of the invention resides in a control system 36 (FIG. 16) for the machine. This control system has manual set-up and automatic operating modes. During the manual set-up mode of the control system, the machine is properly conditioned for its automatic operating mode. During this automatic operating mode, the machine proceeds through an automatic welding cycle to thermally butt weld the plastic sheets 22, 24 to one another.

The operation of the present plastic welding machine 10 will now be briefly described by reference to FIGS. 9 through 15. It should be noted here that FIGS. 9 through 11 depict the automatic set-up mode of the machine, and FIGS. 12 through 15 depict the automatic operating or welding mode of the machine.

Figure 9:
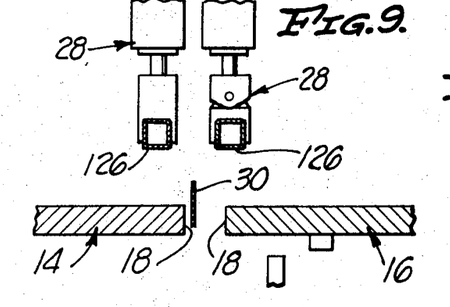
FIGS. 9 through 15 diagrammatically illustrate the automatic working cycle of the machine.

In the normal inoperative condition of the present plastic welding machine 10, the work tables 14, 16, work clamping means 28, and heater blade 30 occupy the positions of FIG. 9. In these positions, the work tables are retracted outwardly away from one another, the work clamping means 28 are retracted upwardly away from the tables, and the heater blade 30 is extended to a work heating position, wherein the blade is situated approximately at the level of the upper work supporting surfaces 20 of the tables. The blade is then disposed between and generally parallel to the inner confronting edges 18 of the tables.

Figure 10:
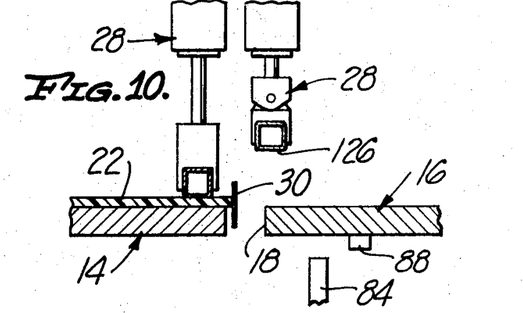

Referring to FIG. 10, the initial step in the manual set-up mode of the machine involves placement of one plastic work member or sheet 22 on the fixed left-hand work table 14. The sheet is then moved edgewise toward and into contact with the adjacent side of the heater blade 30, as shown. At this point, the work clamping means 28 are operated to clamp the work sheet 22 to the work table 14, along the inner edge 18 of the table. The right-hand work table 16 is then extended inwardly toward the fixed work table 14 to the position illustrated in FIG. 11. In the ensuing description, the relative positions of the work tables illustrated in FIGS. 9 and 10 and in FIG. 11 are referred to, respectively, as their retracted positions and their extended work bonding positions.

Figures 11, 12:
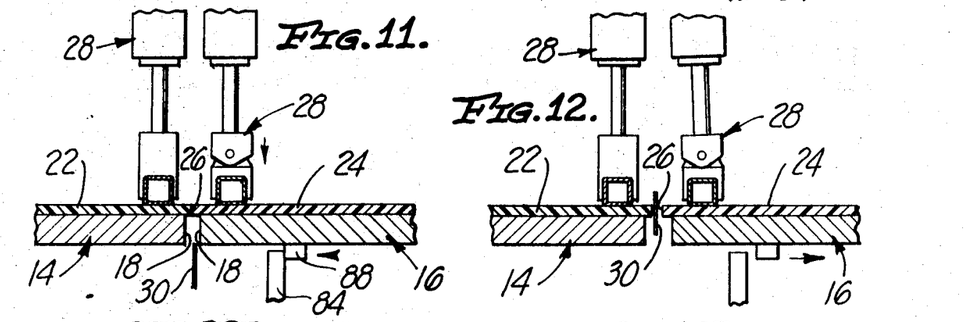

Following inward extension of the movable work table 16 to its position of FIG. 11 and the dropping of blade 30, the work member or sheet 24 is positioned on the table and is moved edgewise toward the work sheet 22 to a position wherein the inner confronting edge surfaces 26 of the two sheets abut one another, as shown. The work clamping means 28 are then operated to clamp the work sheet 24 to the work table 16 along the inner edge 18 of the table. The plastic welding machine 10 is then conditioned for its automatic work cycle.

During the initial phase of this automatic cycle, the movable work table 16 is retracted outwardly to separate the work sheets 22, 24, and the heater blade 30 is extended upwardly to its work heating position of FIG. 12, wherein the blade is disposed between the confronting edge surfaces 26 of the work sheets. Generally concurrently, the blade heating means 32 are activated to heat the blade to a predetermined temperature, on the order of 600° F. When this blade temperature is attained, the right-hand work table 16 is again extended inwardly to its position of FIG. 13. In this position, the inner edge surface 26 of the work sheet 24 presses against the adjacent side of the heated blade 30 and thrusts the blade firmly against the inner edge surface 26 of the work sheet 22. Under these conditions, the inner edge surfaces 26 of the work sheets 22, 24 are pressed into firm contact with and are thereby heated by the balde. The work sheets are retained in this heating position sufficiently long to effect heating of their inner edge surfaces to a tacky state. In the ensuing description, the work table and heater blade positions illustrated in FIG. 13, wherein heating of the inner sheet edges 26 is accomplished, are referred to as the extended work heating position of the blade and the intermediate work heating position of the work tables, respectively. As will appear presently, the work clamping means 28 are uniquely constructed to accommodate outward retraction and inward extension of the movable work table 16, in the manner just explained.

Figure 14:
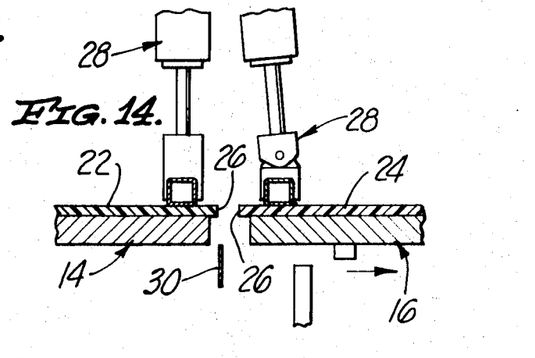
Figure 15:
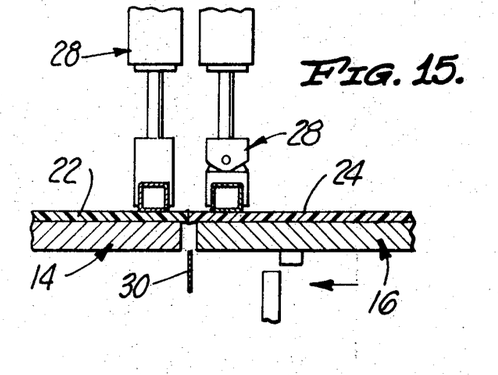

After the inner edge surfaces 26 of the work sheets 22, 24 have been heated, by the heater blade 30, to the proper tacky state, the movable work table 16 is again retracted outwardly to separate the work sheets, as illustrated in FIG. 14. The heater blade 30 is then retracted downwardly from between the work sheets. Immediately after retraction of the blade, the work table 16 is extended inwardly to its corresponding position of FIG. 15 to bring the confronting, now tacky edge surfaces 26 of the work sheets 22, 24 into firm bonding engagement, as illustrated in FIG. 15. The work sheets are retained in bonding engagement for a period of time sufficient to enable cooling or setting of their contacting surfaces. The work clamping means 28 are then retracted and the now butt welded work sheets 22, 24 are removed from the machine to complete one operating cycle of the machine.

Referring now in greater detail to the embodiment of the invention which has been selected for illustration in the drawings, the machine frame 12 may be provided with any convenient shape and, in this instance, has a base 40 to which the left-hand table 14 is rigidly attached by means of frame members 42. The machine frame 12 also includes a horizontal frame platform 44 located directly below the movable work table 16. This platform has spaced parallel frame bars 46 which extend horizontally across the underside of the work table 16, normal to its inner edge 18. Bolted to the underside of the work table 16 are a number of bearing sleeves 48. These bearing sleeves are equal in number to and slidably receive the frame bars 46. The work table bearing sleeves 48 are somewhat shorter than the frame bars 46, as may be best observed in FIG. 6. The bars and sleeves serve to support the movable work table 16 on the machine frame 12 for edgewise movement of the table between its extended and retracted positions relative to the fixed work table 14.

Figure 4:
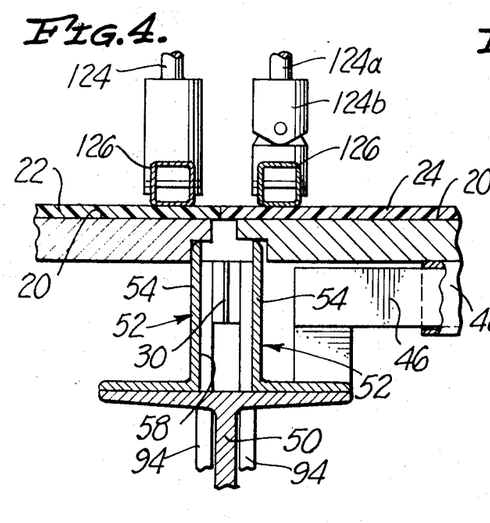
FIG. 4 is an enlarged fragmentary vertical section through the machine showing a pair of plastic work sheets clamped to the work tables with the latter extended to bring the confronting edge surfaces of the sheets into firm bonding engagement.
Figure 5:
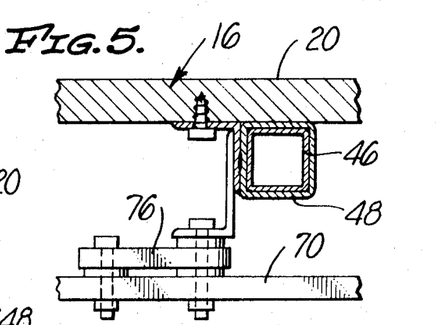
FIG. 5 is a section taken on line 5—5 in FIG. 3.

Extending across the top of the frame base 40, directly below and parallel to the inner confronting edges 18 of the work tables 14, 16, is a beam 50. This beam is rigidly attached to the frame base. Welded or otherwise rigidly joined to the upper flange of the beam 50 are a pair of angles 52 having upstanding vertical flanges 54. The inner edge of the fixed work table 14 rests on and is rigidly secured to the flange 54 of the left-hand frame angle 52, in FIG. 4. The inner edge of the movable work table 16 overlies and is disposed in slidable vertical supporting engagement with the vertical flange 54 of the right—and frame angle 52 in FIG. 4. In FIG. 4, it will also be observed that the inner ends of the work table supporting frame bars 46 are supported on and rigidly attached to the frame beam 50.

As shown best in FIG. 4, the upstanding frame angle flanges 54 are spaced to define therebetween an elongate upwardly opening channel 58 directly below the inner confronting edges 18 of the work tables 14, 16. The heater blade 30 extends longitudinally through this channel and is mounted on the machine frame 12 for vertical movement in the channel, as will be hereinafter explained.

Figure 6:
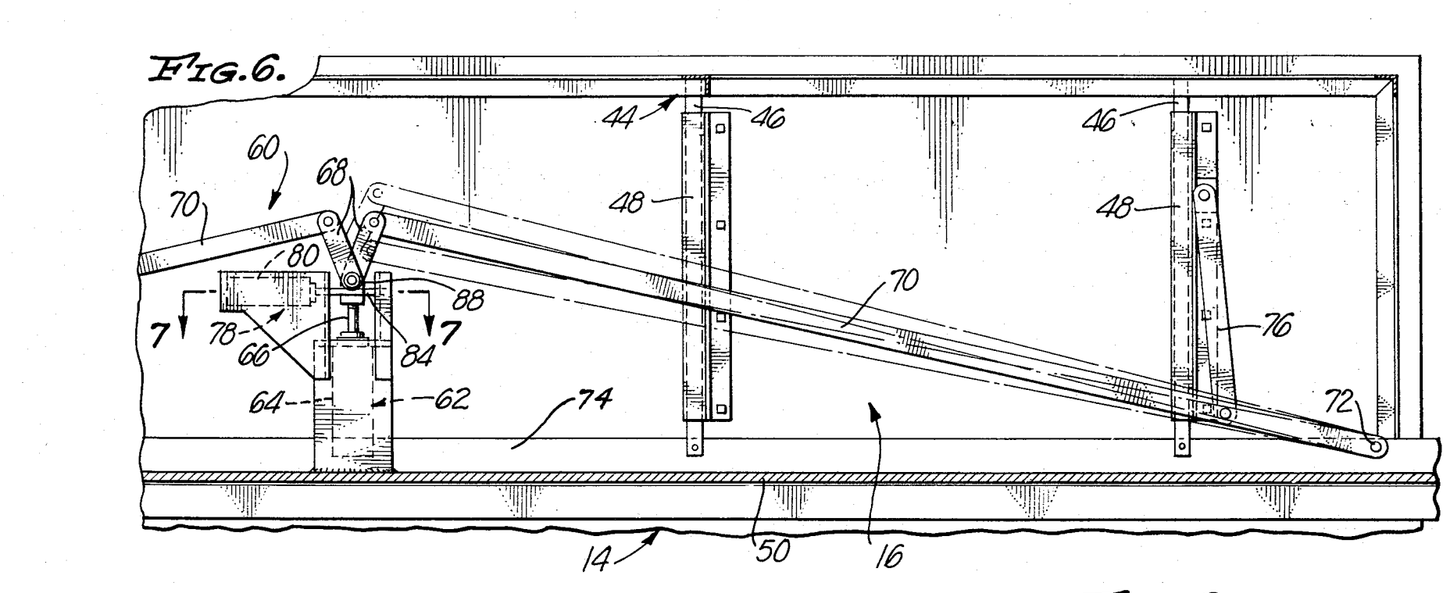
FIG. 6 is an enlarged section taken on line 6—6 in FIG. 1.

Associated with the movable work table 16 are table drive means 60 for moving the table between its extended and retracted positions and through its intermediate work bonding position. Referring to FIG. 6, the table drive means 60 comprise a fluid pressure operated ram 62 having a cylinder 64 rigidly mounted on the frame platform 44. The cylinder 64 is located intermediate the ends of the platform and is disposed with its axis horizontal and extending parallel to the direction of edgewise movement of the work table 16. Movable within the cylinder 64 is a plunger 66 which extends from the inner end of the cylinder, as shown. A pair of connecting links 68 are pivotally attached at one end to the outer end of the ram plunger 66. Pivotally attached to the outer ends of the connecting links 68, respectively, are a pair of work table operating levers 70. Each lever 70 extends generally lengthwise of the machine frame 12 and from its respective connecting link 68 toward the adjacent end of the frame. The distal end of each table operating lever 70 is pivotally attached at 72 to the adjacent end of flange 74 of beam 50 of the frame platform 44 which extends along the outer edge of the platform. Pivotally connected between the outer end of each work table operating lever 70 and the adjacent end of the movable work table 16 is a connecting like 76.

It is evident from the above description and from FIG. 6 that extension and retraction of the ram plunger 66 is effective to drive the movable work table 16 edgewise toward and away from the fixed work table 14. More specifically, upward or inward extension of the ram plunger 66 in FIG. 6 drives the work table 16 inwardly to its extended work bonding position shown in FIGS. 4, 11 and 15. Downward or outward retraction of the plunger in FIG. 6 drives the work table 16 to its outer retracted position shown in FIGS. 9 and 10.

Figure 7:
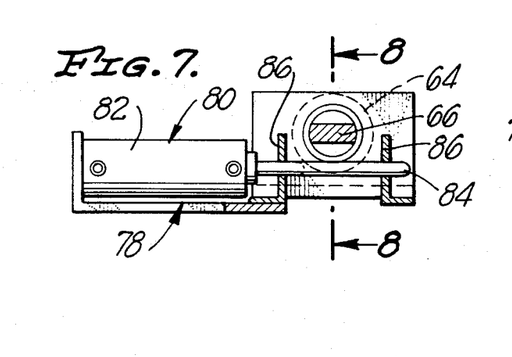
FIG. 7 is an enlarged section taken on line 7—7 in FIG. 6.
Figure 13:
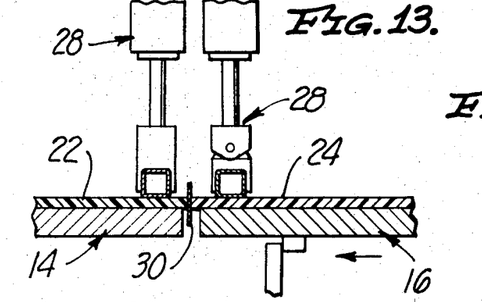

Also associated with the movable work table 16 are means 78 for effecting inward extension of the table to its intermediate work heating position of FIG. 13. In this case, the means 78 comprise a limit stop means including a fluid pressure actuated ram 80 having a ram cylinder 82. The axis of the ram cylinder 82 extends normal to and is laterally displaced from the axis of the ram cylinder 64. Movable within the ram cylinder 82 is a plunger 84 which acts as and will be hereinafter referred to as a stop. Stop 84 extends slidably through a pair of aligned bearing holes which are drilled through plates 86 rigid on the table operating ram 62. Referring to FIG. 7, it will be observed that these plates are located at opposite sides of the table operating ram plunger 66. Stop 84 is movable longitudinally between its solid line extended position and its broken line retracted position of FIG. 7. In its extended position, the stop is situated within the path of a laterally projecting lug 88 on the ram plunger 66. When retracted, the stop clears the lug.

Figure 8:
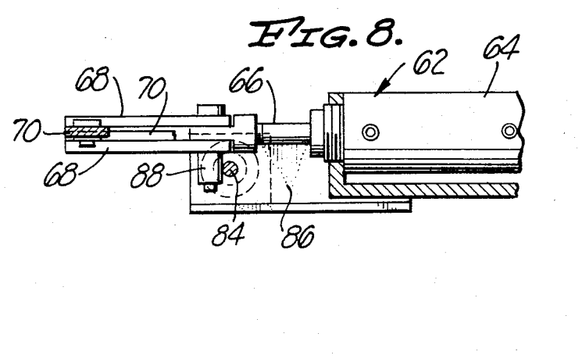
FIG. 8 is a section taken on line 8—8 in FIG. 7.

The work table drive means 60 are so constructed and arranged that outward or downward retraction of the work table operating ram plunger 66 in its cylinder 64 in FIG. 6 drives the movable work table 16 outwardly to its retracted position of FIGS. 9 and 10. Upward or inward extension of the ram plunger 66 from this retracted position, with the work table stop 84 extended, drives the work table 16 inwardly until the operating ram plunger lug 88 engages the stop, as shown in FIG. 8. This arrests the work table 16 in its intermediate, work heating position of FIG. 13. Retraction of the stop 84 permits continued inward driving of the work table 16, by its operating ram 62, to the inner extended work bonding position of the table, illustrated in FIGS. 4, 11 and 15.

Associated with the heater blade 30 are means 90 for supporting the blade and driving the latter vertically between its extended position of FIGS. 9, 10, 12 and 13 and its retracted position of FIGS. 3, 4, 11, 14 and 15. The blade driving means 90 comprise a pair of levers 92 which are pivotally supported intermediate their ends on the frame beam 50, adjacent the ends of this beam. The levers 92 extend generally longitudinally of the beam and project beyond the adjacent ends of the beam, as shown. Pivotally attached intermediate their ends to the outer ends of the levers 92 are connecting links 94. The upper ends of the connecting links 94 are pivotally attached to the ends of the heater blade 30. Pivotally attached at their upper ends to the inner ends of the heater blade operating levers 92 are connecting links 96. The lower end of each connecting link 96 is pivotally attached to the overlapping ends of a pair of connecting links 98 and 100. Each link 98 extends from its respective connecting link 96 generally longitudinally of and toward the center of the machine frame 12. The inner end of each link 98 is pivotally connected, by a coupling link 102, to the underside of the frame beam 50. The lower end of each connecting link 100 is pivotally attached to the plunger 104 of a blade operating ram 106. Each ram 106 has a cylinder 108 which is pivotally attached to the machine frame 12. Extending between the lower end of each connecting link 94 and the common pivot joint of the corresponding connecting links 96, 98, 100 is a tension spring 108 in series with a turnbuckle 110. The springs 108 are attached to the connecting links 94. The turnbuckles 110 are connected to the common pivot joints of the corresponding links 96, 98, 100.

Figure 1:
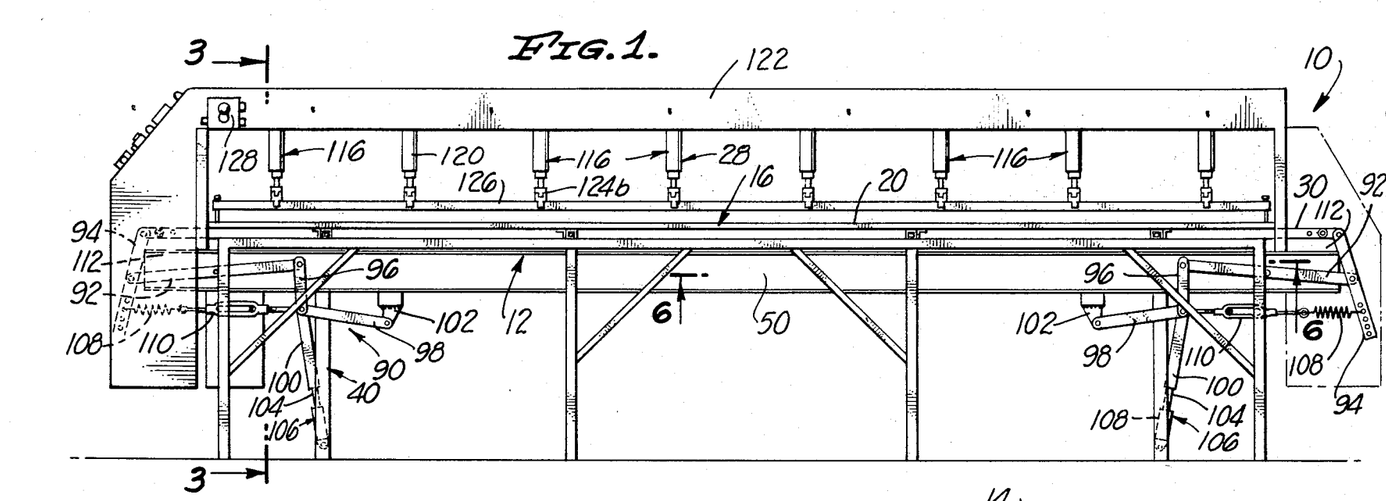
FIG. 1 is a side elevation of an automatic plastic welding machine according to the invention.
Figure 2:
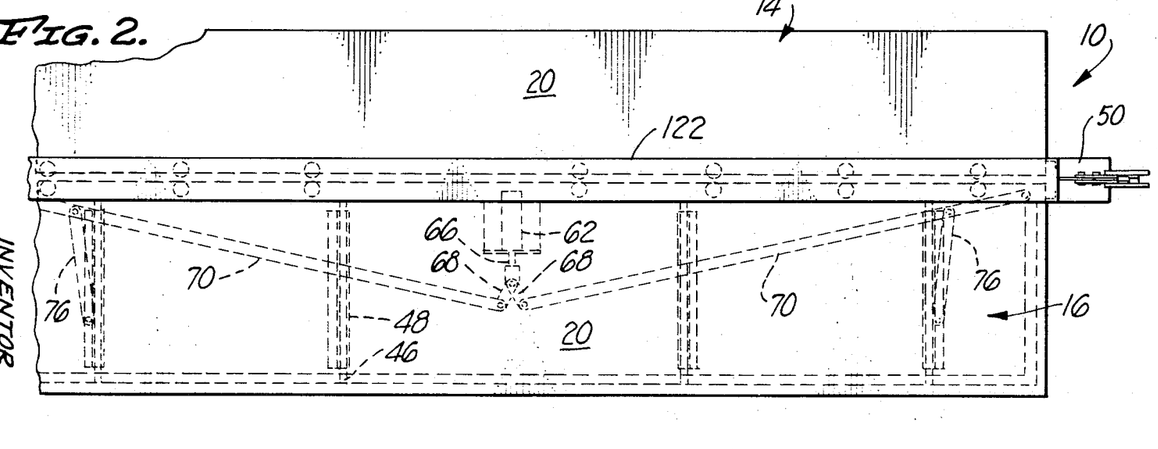
FIG. 2 is a fragmentary top plan view of the machine.
Figure 3:
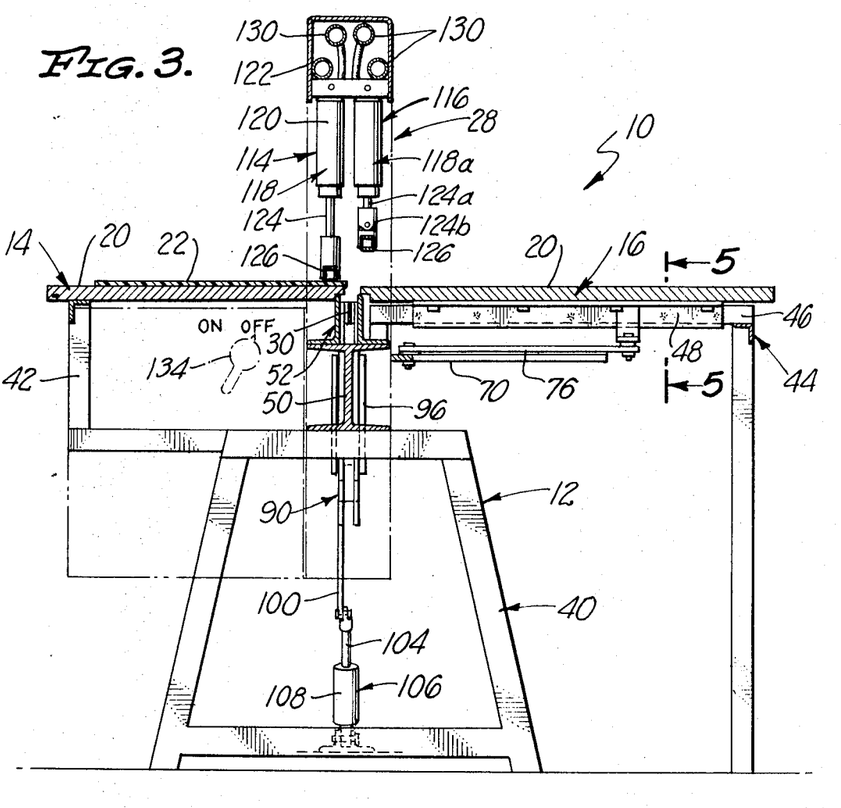
FIG. 3 is an enlarged section taken on line 3—3 in FIG. 1 showing the work tables of the machine separated or retracted and a plastic work sheet clamped to one of the tables.

It is evident from the foregoing description and from FIG. 1 that the springs 108 serve to longitudinally tension the heater blade 30. The turnbuckles 110 are adjustable to vary the tension in the blade. Referring particularly to FIG. 1, it will be observed that downward retraction of the heater blade operating ram plungers 104 in FIG. 1 into their respective ram cylinders 108 elevates the heater blade 30 to its extended position of FIGS. 9, 10, 12 and 13. Upward extension of the ram plungers 104 from their cylinders 108 lowers the heater blade 30 to its retracted position of FIGS. 3, 4, 11, 14 and 15.

The heater blade 30 is electrically heated. To this end, the blade comprises an electrical heating element through which an electrical current is adapted to flow for heating the element. At the end of the blade are electrical terminals 112. These terminals are electrically connected to the blade heating means 32 which, in this instance, comprises an electrical power source for supplying energizing current to the blade. The manner in which the power source is controlled will be explained presently in connection with the control system 36.

As noted earlier, the present plastic welding machine 10 is equipped with work clamping means 28 for clamping the plastic work members or sheets 22, 24 to the work tables 14, 16. These work clamping means comprise a clamping mechanism 114 for the work sheet 22 and the fixed work table 14 and a second clamping mechanism 116 for the work sheet 24 on the movable work table 16. The work clamping mechanism 114 has a number of fluid pressure actuated rams 118 which are spaced lengthwise of the machine and include cylinders 120. The upper ends of these cylinders are pivotally attached to a cross beam 122 which extends lengthwise of the welding machine, a distance above the work tables 14, 16 and directly over the frame beam 50. Movable in an extending from the lower end of each cylinder 120 is a plunger 124. The lower ends of the plunger 124 are rigidly secured to a clamp bar 126 which extends the full length of the machine just over the work table 14, adjacent and parallel to its inner edge 18. The work clamping mechanism 116 is identical to the work clamping mechanism 114 except that the plungers 124a of the rams 114a of the clamping mechanism 116 have pivot joints 124b which permit the clamping bar 126 of the clamping mechanism 116 to rock back and forth relative to the plungers for reasons to be explained presently. Controls 128 are provided for selectively pressurizing the rams 114, 116 to extend the clamping bars 126 downwardly into clamping engagement with the work sheets 22, 24 and raise the clamping bars out of clamping engagement with the work sheets. Pressure fluid is conveyed to and from the rams 114, 116 through conduits 130 extending through the hollow interior of the upper frame cross member 122.

Figure 16:
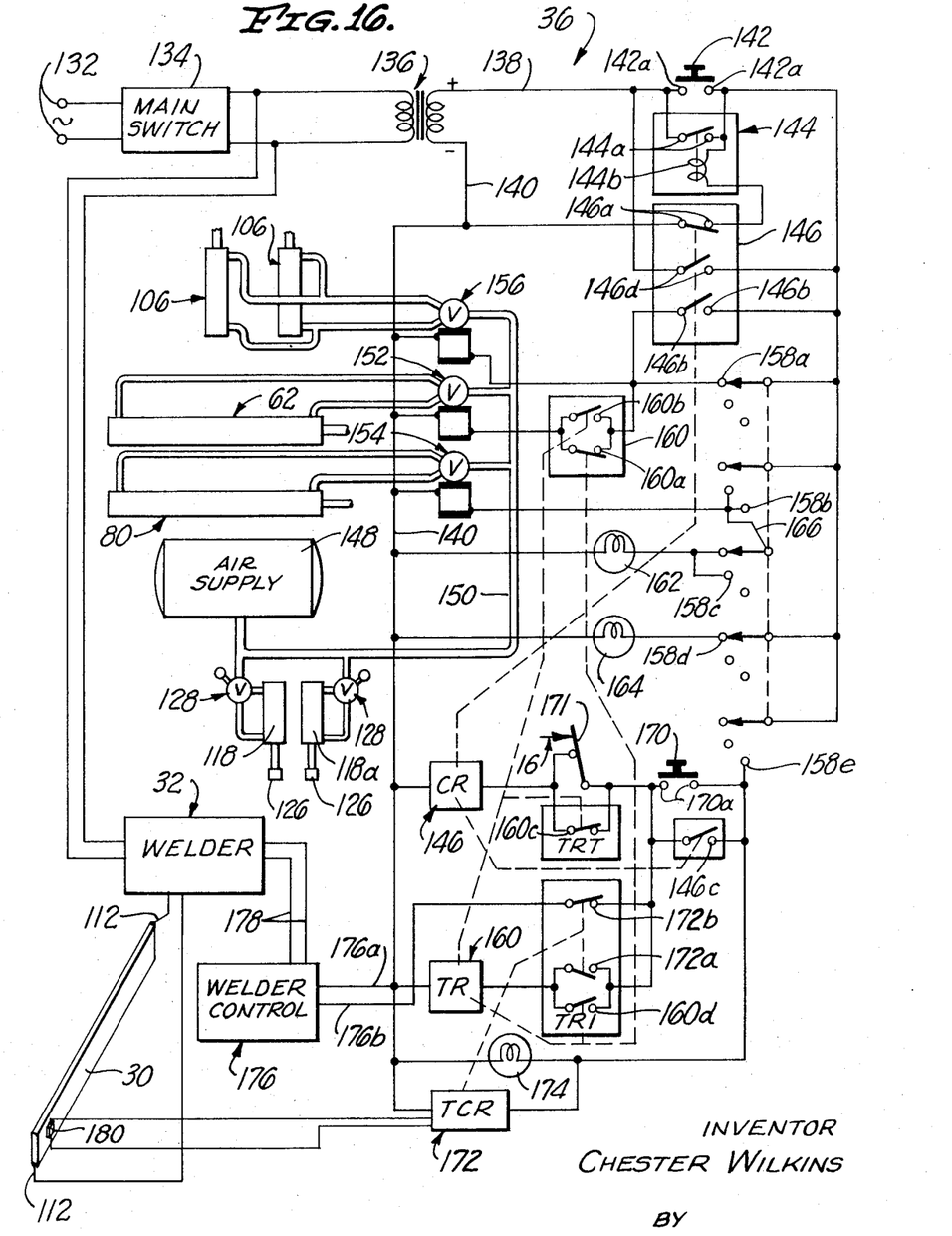
FIG. 16 schematically illustrates the automatic control system of the machine.

Reference is now made to FIG. 16 illustrating the control circuit 36 of the present welding machine. This control circuit has terminals 132 for connection to an electrical power source and leading to the machine through a main switch 134. Closure of the main switch 134 delivers electrical power to a transformer 136 and to the heater blade energizing unit 32. Connected to the secondary of the transformer 136 are a pair of main leads 138, 140. Connected in electrical parallel within the lead 138 are the normally open contacts 142a of a control switch 142 and the normally open contacts 144a of a relay 144. One terminal of the relay coil 144b is connected to the normally open sides of the switch contacts 142a and relay contacts 144a. The other terminal of the relay coil 144b is connected to the main lead 140 through the normally closed contacts 146a of a control relay 146. It is now evident, therefore, that closure of the control switch contacts 142a energizes the relay coil 144b and this, in turn, results in closing of the relay contacts 144a to lock or hold the coil in energized condition. Relay 146 has three sets of normally open contacts, 146b, 146c and 146d. Relay contacts 146b and 146c will be referred to presently. Relay contacts 146d are connected in electrical parallel with the manual switch contacts 142a and the relay holding contact 144a.

As shown in the upper central portion of FIG. 16, the work table drive ram 62, the work table limit stop ram 80, and the heater blade drive rams 106 receive working fluid under pressure from the pressurized fluid supply 148 through a manifold line 150 and solenoid valves 152, 154 and 156, respectively. One terminal of each valve 152, 154 and 156 is directly connected to the main power supply lead 140. The other terminal of the solenoid valve 152 for the table drive cylinder 62 is connected to the main power lead 138 through the normally open contact 146b of the control relay 146, a set of selector contacts 158a of a selector gang switch 158, and the contacts 160a, 160b of a timing relay 160. The timing relay contacts 160a are normally closed and the timing relay contacts 160b are normally open. The other terminal of the solenoid valve 154 for the work table limit stop positioning ram 80 is connected to the main power lead 138 through a second set of selector contacts 158b of the selector gang switch 158. Finally, the other terminal of the solenoid valve 156 for the heater blade drive rams 106 is connected to the lead 138 through the normally open control relay contacts 146b and the selector switch contacts 158a. The selector switch 158 has three additional sets of selector switch contacts 158c, 158d and 158e. Indicator lamps 162, 164 are connected between the main power lead 140 and the selector switch contacts 158c, 158d as shown. Each of the selector switch contact sets 158a, 158b, 158c, 158d, and 158e has a rotary contact. These several rotary contacts are ganged on a common shaft such that all of the rotary contacts may be turned from one position to the other in unison. The rotary contacts of the contacts sets 158a, 158b, 158d, and 158e are directly tied to the power lead 138. The rotary contact of the remaining contact set 158c is connected, by a jumper 166, to certain contacts of the adjacent contact set 158b, for reasons to be explained presently.

It should be noted here that the work clamping rams 118, 118a of the work clamping means 28 receive working fluid under pressure from the fluid manifold 150 through valves which comprise the clamp control means 128. Thus, the work clamping rams 118, 118a may be selectively pressurized, by operation of the ram valves 128, to extend the clamping bars 126 into and retract these bars from clamping engagement with the work sheets 22, 24 on the work tables 14, 16.

The upper right-hand portion of the control system 36 in FIG. 16, which is serviced by the selector gang switch contacts 158a, 158b, 158c and 158d is designed to effect the manual setting mode, referred to earlier, of the present plastic welding machine. The remaining, lower right-hand portion of the control system, which is serviced by the remaining selector gang switch contact 158e, is designed to effect the automatic welding load or cycle of the machine. This latter portion of the control system includes the control relay 146 and the timing relay 160. One terminal of each of these relays is directly connected to the main power lead 140. The remaining terminal of the control relay 146 is connected to the other power lead 138 through the selector switch contacts 158e, the normally open contacts 170a of a manual control switch 170, a set of normally open contacts 146c of the control relay 146, a normally closed limit switch 171 for the movable work table 16, and a set of normally closed contacts 160c of the timing relay 160. The control relay contacts 146c and the manual switch contact 170a are arranged in electrical parallel, as are the work table limit switch 171 and the timing relay contacts 160c. The other terminal of the timing relay 160 is connected to the main power lead 138 through the selector switch contacts 158e, the control relay contacts 146c, the manual switch contacts 170a, a set of normally open contacts 160d of the timing relay and a set of normally open contacts 172a of a temperature control relay 172. This temperature control relay includes a set of normally closed contacts 172b. One terminal of the temperature control relay 172 is directly connected to the power lead 140. The other terminal of the relay is connected to the power lead 138 through the selector switch contacts 158e. An indicator lamp 174 is connected across the temperature control relay.

Associated with the energizing unit 32 for the heater blade 30 is a current control device 176, referred to herein as a welder control. This welder control has two input terminals 176a, 176b. Terminal 176a is directly connected to the main power lead 140. The other input terminal is connected to the other power lead 138 through the normally closed contact 172b of the temperature control relay 172, the control relay contacts 146c, the manual switch contacts 170a, and the selector switch contacts 158e. The welder control 176 has output terminals which are connected, through leads 178, to the heater blade energizing unit 32.

The operation of the present plastic welding machine 10 will now be described in detail by reference to FIG. 16. The machine is conditioned for operation by closing the main switch 134 to deliver energizing current to the heater blade energizing unit 32 and to the primary of the transformer 136. Initially, the manual control switches 142, 170 will be open and the solenoid valves 152, 154, 156 for the work table drive ram 62, the work table limit stop positioning ram 80, and the heater blade drive ram 106 will be deenergized. Under these conditions, the ram 80 is pressurized in a direction to retract the work table limit stop 84 and the ram 62 is pressurized in a direction to drive the work table 16 inwardly to its extended work bonding position of FIGS. 3, 4, 11 and 15. The initial operating step of the machine involves rotation of the selector switch 158 to its number one position, illustrated in FIG. 16, and depression of the manual control switch 142 to momentarily close its contacts 142a. Closure of these switch contacts energizes the relay coil 144b with resultant closing of the normally open relay holding contacts 144a to lock the relay in its energized condition. Closing of the relay holding contacts 144a also energizes the selector switch 158. Under these conditions, the solenoid valve 152 for the work table drive ram 62 is energized through the selector switch contacts 158a and the normally closed timing relay contacts 160a. The ram 62 is then pressurized in a direction to retract the movable work table 16. Simultaneously, the solenoid valve 156 for the heater blade operating rams 106 is energized through the selector switch contacts 158a. These rams are then pressurized in a direction to elevate the heater blade 30 to its extended work heating position of FIGS. 9 and 10. A thermoplastic work sheet 22 is then placed on top of the fixed work table 14, and the sheet is moved edgewise toward and into engagement with the heater blade 30, as shown in FIG. 10. This locates the work sheet in proper welding position on the work table 14. The rams 118 of the work clamping mechanism 114 are then pressurized in a direction to lower the corresponding work clamping bar 126 into clamping engagement with the work sheet 22 to retain the latter in position on the work table 14. At this time, the indicator lamp 164 is energized through the selector switch contacts 158d to indicate the position of the selector switch in its number one position.

After the work sheet 22 has been firmly clamped to the fixed work table 14, the selector switch 158 is rotated to its number two position. In this number two position, the selector switch contacts 158a are open to deenergize the solenoid valve 152 for the work table drive ram 62 and the solenoid valve 156 for the heater blade operating rams 106. Simultaneously, the selector switch contacts 158b are closed to energize the solenoid valve 154 for the work table stop positioning ram 80. The ram 80 is then pressurized in a direction to extend the work table positioning stop 84. Deenergizing of the solvenoid valves 152, 154 results in lowering of the heater blade 30 to its retracted position and inward extension of the work table 16 to its intermediate position of FIG. 11, wherein inward extension of the table is arrested by the currently extended table stop 84. Rotation of the selector switch contacts 158c and 158d to their number two positions darkens the indicator lamp 164 and illuminates the indicator lamp 162 to indicate that the selector switch is in its number two position. At this point, the second work sheet 24 is placed on top of the movable work table 16 and is moved edgewise toward the work sheet 22 to butt the confronting edge surfaces 26 of the work sheet. The clamping rams 118a for the work clamping mechanism 116 are then pressurized to lower the corresponding clamping bar 126 into clamping engagement with the work sheet 24, thereby to firmly clamp the latter in position on the work table 16.

This completes the manual setting mode of the present plastic welding machine and conditions the latter for its automatic welding mode or working cycle. This automatic working cycle of the machine is initiated by rotation of the selector switch 158 to its number three position and depression of the manual control switch 170 to close its normally open contact 170a.

Closure of the switch contacts 170a energizes the control relay 146 through the work table limit switch 171. Control relay 146, when energized, operates to open its normally closed contacts 146a and to close its normally open contacts 146b, 146c, and 146d. Opening of the relay contacts 146a breaks the holding circuit of the relay 144, thereby reopening its holding contact 144a and interrupting the energizing circuit to the selector switch 158 through the relay 144. However, closure of the relay contact 146d simultaneously completes an energizing circuit to the selector switch and parallel with the now open relay holding contacts 144a. Accordingly, the selector switch remains energized. As a consequence, closure of the control relay holding contacts 146c in response to energizing the control relay 146 through the manual switch contacts 170a locks the control relay in energized condition. Closure of the control relay contacts 146b completes an energizing circuit from the power lead 38 to the timing relay contacts 160a and 160b and parallel with the now open selector switch contacts 158a. The work table solenoid 152 and the heater blade solenoid 156 are thereby energized to retract the movable work table 16 and raise the heated blade 30. The work table limit stop solenoid 154 is energized through the selector switch contacts 158b to extend the work table limit stop 84. Retraction of the work table 16 opens the work table limit switch 171. However, the control relay 146 remains energized through the normally closed timing relay contacts 160c. It should be noted here that rotation of the selector switch 158 to its number three position extinguishes the indicator light 162 and illuminates the indicator light 174 to indicate that the selector switch is presently in its number three position. Referring to the lower portion of FIG. 16, it will be observed that when the selector switch 158 is in its number three position, the welder control 176 is energized through the normally closed contacts 172b of the temperature control relay 172.

It will now be understood that when the present plastic welding machine is conditioned for its automatic working or welding cycle by rotation of the selector switch 158 to its number three position and closing of the manual start switch 170, the moveable work table 16 is initially retracted and the heater blade 30 is raised to its extended work heating position. Simultaneously, the welder control 176 is energized to activate the heater blade heating means 32 which then heats the blade to proper work heating temperature. The movable work table 16 remains retracted during this heating phase of the machine operation.

Associated with the temperature control relay 172 are thermocouples 180 or other temperature sensors for sensing the temperature of the heater blade 30. When the blade reaches its proper operating temperature, the temperature control relay 172 is energized to close its normally open contacts 172a and open its normally closed contacts 172b. Opening of the temperature control relay contacts 172b de-energizes the welder control 176 to terminate heating of the blade 30. Closing of the temperature control relay contacts 172a, energizes the timing relay 160.

Timing relay 160 has two operating phases. The first operating phase occurs instantaneously in response to energizing of the timing relay by closing of the temperature control relay contacts 172a, and involves opening of the timing relay contact 160a and closing of the timing relay contact 160b. Relay contacts 160d are holding contacts with the timing relay 160. Closing of these contacts, therefore, locks the timing relay in its energized condition. Opening of the timing relay contacts 160a de-energizes the work table solenoid valve 152 and causes inward extension of the work table to a position wherein the inner edge of the thermoplastic worksheet 24 on the table engages the sheeted blade 30. At this point, it is significant to recall that the blade is currently in its upper extending work heating position, wherein the blade engages the inner edge of the thermoplastic worksheet 22 on the fixed work table 14. The timing relay 160 remains in its first operating phase for a predetermined interval of time, sufficient to cause heating of the inner edge surfaces of the work sheets 22, 24 to the proper tacky state for bonding of the sheets to one another. This time interval is typically on the order of thirty to sixty seconds.

At the end of the interval, the timing relay 160 enters its second operating phase. This second operating of the timing relay involves simultaneous closure of its normally open contact 160b and opening of its normally closed contacts 160c. Closure of the timing relay contacts 160b re-energizes the work table solenoid valve 152 to cause outward retraction of the moveable work table 16. This outward retraction of the moveable work table separates the work sheets 22, 24 to release the blade 30 for downward movement to its retracted position. Opening of the timing relay contacts 160c provides a single energizing circuit for the control relay 146 which is through the currently closed work table limit switch 171. As the currently retracting moveable work table 16 approaches its outer limiting position, it engages and opens this limit switch to de-energize the control relay 146. The control relay contacts 146a, 146b, 146c and 146d then return to their normal positions. In these normal positions, the control relay contacts 146b and 146d are open, so that the control circuit is restored to its normal de-energized state. This causes de-energizing of the work table solenoid valve 152, the limit stop solenoid valve 154, and the heater blade solenoid valve 156. The heater blade 30 now returns to its lower retracted position, the limit stop 84 returns to its retracted position, and the moveable work table 16 moves inwardly to its fully extended position, wherein the now tacky inner edges of the thermoplastic work sheets 22, 24 are pressed into firm mutual bonding contact to effect butt welding of these work sheets to one another. The work sheets are left in position on the work table until the bond between the sheets is properly cooled. The welded sheets are then removed from the machine to complete one operating cycle.

While the invention has been disclosed in connection with the presently preferred embodiment thereof, various modifications of the invention are possible within the spirit and scope of the following claims.

What is claimed as new in support of Letters Patent is:

1. A machine for thermally butt welding two wide thermoplastic work sheets edge to edge comprising:
   a frame,
   a pair of coplanar horizontal work tables mounted on said frame for relative edgewise movement toward and away from one another, said tables having adjacent confronting edges and work supporting surfaces,
   means for clamping said work sheets to said tables, respectively, with edge surfaces of the sheets disposed in parallel confronting relation along said confronting table edges, said clamping means comprising clamping bars which engage said work sheets closely adjacent and parallel to said edge surfaces and press said work sheets against said tables along the full length of said edge surfaces,
   a heater blade mounted on said frame within a plane passing between said confronting table edges generally normal to said table surfaces for movement in said plane between an extended work heating position wherein said blade is located approximately at the level of said table surfaces and a retracted position spaced from said tables,
   means for driving said blade between its extended and retracted positions,
   means for heating said blade,
   means for driving said tables in relative edgewise movement between retracted positions wherein said edge surfaces of the work members when clamped to said tables are spaced a substantial distance apart and extended work bonding positions wherein said edge surfaces of the work members are pressed firmly together, and through intermediate work heating positions when said edge surfaces of the work members are slightly spaced and disposed for contact with opposite sides of said blade when said blade occupies its extended work heating position, and
   operating means including means responsive to the temperature of said blade for operating said blade heating means, said blade driving means, and said table driving means in timed relation in such a way as to cause said machine to proceed through an automatic work cycle involving initial relative retraction of said tables, heating of said blade to a predetermined temperature, extension of said blade to its work heating position, relative extension of said work tables to their intermediate work heating position in response to heating of said blade to a predetermined tempearture to bring said edge surfaces of the work members into contact with said blade for heating of said edge surfaces to a tacky state, momentary relative retraction of said tables, retraction of said blade, and reextension of said tables to work bonding position to bring the heated tacky edge surfaces of said work members into firm bonding contact.

2. A machine according to claim 1 wherein said operating means comprises:
   timing means activated in response to relative extension of said tables to intermediate work heating position to effect retention of said tables in said intermediate position for a predetermined interval of time and then momentary relative retraction of said tables.

3. A machine according to claim 1 wherein said operating means comprises:
   timing means activated in response to relative extension of said tables to intermediate work heating position to effect retention of said tables in said intermediate position for a predetermined interval of time and then momentary relative retraction of said tables, and
   limit means operable in response to relative extension of said work tables to work bonding position for restoring said operating means to a normal state, wherein said operating means are conditioned for the next operating cycle of said machine.

4. A machine according to claim 1 wherein:
   one of said tables is fixed and the other table is movable toward and away from the fixed table, and
   said table drive means comprise a pair of levers extending lengthwise of the movable table between the center and ends of the movable table, pivot means pivotally connecting the other ends of said levers to said frame, means connecting said levers and movable table adjacent said lever pivot means, whereby pivoting of said levers extends and retracts said movable table, and a fluid pressure ram connected between said frame and the inner ends of said levers.

5. A machine for thermally butt welding two wide thermoplastic work sheets edge to edge comprising:
   a frame,
   a pair of coplanar tables mounted on said frame and having confronting edges and work supporting surfaces,
   means rigidly securing one of said tables to said frame,
   means supporting the other table on said frame for edgewise movement toward and away from said fixed table,
   a pair of levers extending lengthwise of said movable table between the center and ends of said movable table, pivot means attaching the outer ends of said lever to said frame, means connecting said levers and movable table adjacent said pivot means, whereby rotation of said levers about their respective pivot means moves said movable table edgewise toward and away from said fixed table, and a fluid pressure actuated ram connected between the inner ends of said levers and said frame for rotating said levers to drive said movable table toward and away from said fixed table.

6. A machine for thermally butt welding two wide thermoplastic work sheets edge to edge comprising:

a frame, a pair of coplanar work tables mounted on said frame for relative edgewise movement toward and away from one another, said tables having confronting edges and work supporting surfaces, one table being fixed to said frame and the other table being movable relative to the fixed table, fluid pressure actuated ram means for effecting relative edgewise movement of said tables toward one another to fully extended positions, wherein said table edges are disposed in close proximity comprising a fluid pressure actuated ram between the ends of said movable table, levers extending lengthwise of said movable table between said ram and the ends of said movable table, pivot means pivotally attaching the outer ends of said levers to said frame, means pivotally joining said levers and movable table adjacent said pivot means whereby rotation of said levers about said pivot means drives said movable table edgewise toward and away from said fixed table, and means operatively connecting said ram to the inner ends of said levers whereby extension and retraction of said ram rotates levers to extend and retract said movable table, and a retractible limit stop means which is extendable to limit inward extension of said movable table to an intermediate partially extended position, wherein said confronting table edges are spaced a predetermined distance and retractible to permit full inward extension of said movable table toward said fixed table.

7. A machine according to claim 6 wherein:

said limit stop is mounted on said frame for extension into the path of extension of said ram.

References Cited

UNITED STATES PATENTS

| | | | |
|---|---|---|---|
| 2,272,881 | 2/1942 | Stevens | 156—366 |
| 2,384,014 | 9/1945 | Cutter | 156—366 |
| 3,100,731 | 8/1963 | Brey | 156—502 |
| 2,928,926 | 3/1960 | Winz | 156—367X |
| 3,186,891 | 6/1965 | Gelling et al. | 156—366 |
| 3,282,766 | 11/1966 | Wright | 156—304X |
| 3,299,251 | 1/1967 | Zelnick | 156—366X |
| 3,325,328 | 6/1967 | Henley | 156—502X |

FOREIGN PATENTS

| | | | |
|---|---|---|---|
| 626,520 | 8/1961 | Canada | 156—502 |

BENJAMIN A. BORCHELT, Primary Examiner

G. E. MONTONE, Assistant Examiner

U.S. Cl. X.R.

156—362, 359, 367, 502, 544